Patented Feb. 3, 1953

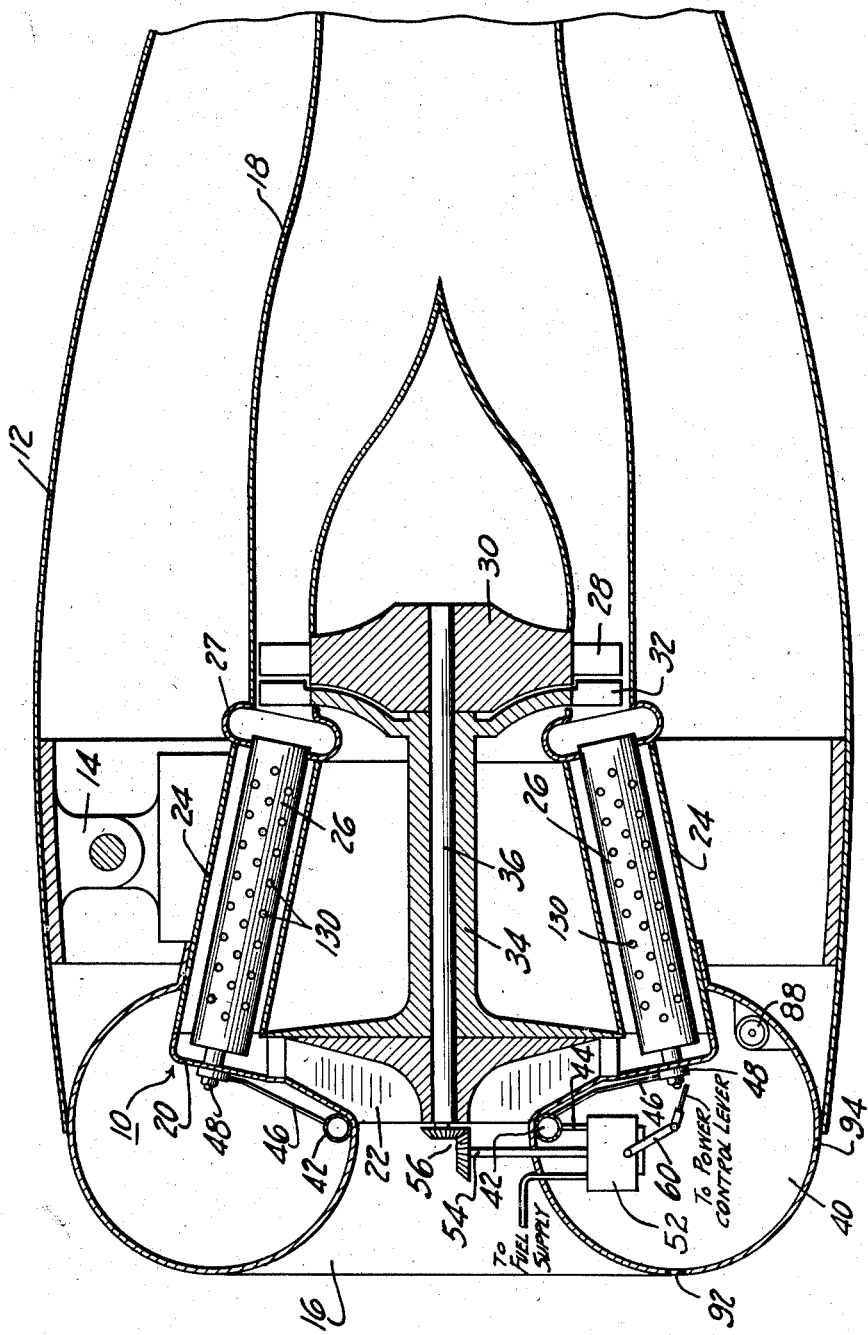

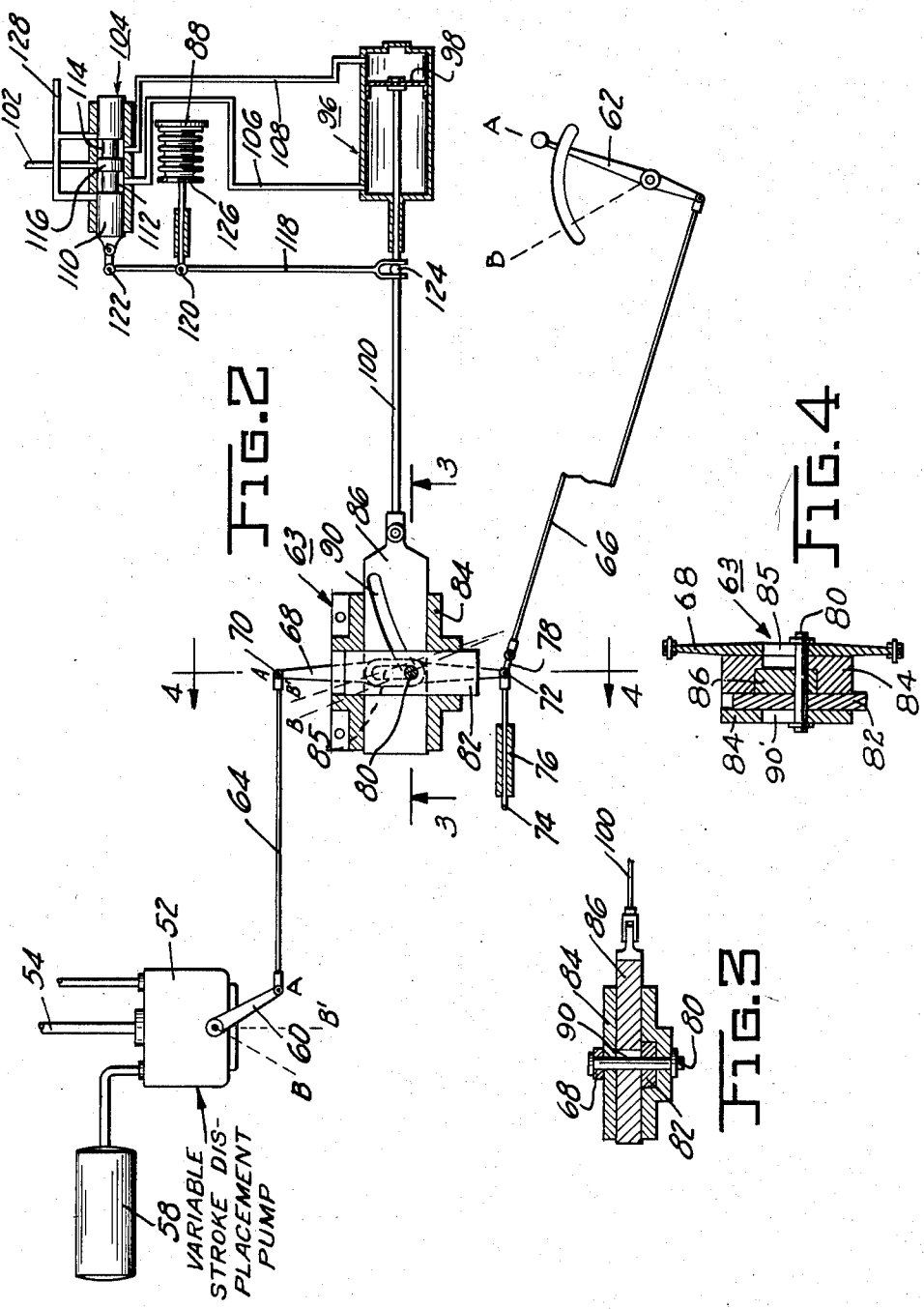

2,627,305

UNITED STATES PATENT OFFICE 2,627,305

AIR DENSITY COMPENSATING FUEL FEEDING SYSTEM FOR GAS TURBINES

Frank C. Mock, South Bend, Ind., assignor to Bendix Aviation Corporation, South Bend, Ind., a corporation of Delaware Application January 11, 1945, Serial No. 572,277

5 Claims. (Cl. 158—36.4)

1

This invention relates to a system for controlling the flow of fuel to a power plant, and more particularly to a novel construction for regulating fuel flow in connection with gas turbines of the type which may utilize the expanding gases to secure a propulsive effect, as in the case of a jet propulsion power plant, or of the type which drives a propeller of an aircraft.

One of the objects of the present invention is to provide a novel apparatus for regulating the quantity of liquid fuel delivered to the burners or generators of a jet propulsion mechanism of the type which may be employed as the power plant of an aircraft.

Another object is to provide a novel fuel regulating mechanism for a gas turbine, which may be especially adapted for, but not limited to use with an aircraft jet propulsion power plant, and which effects an automatic control of the fuel delivery in accordance with certain conditions of operation of the aircraft, thus materially improving the efficiency of operation of the power plant.

Still another object of the invention resides in regulating the fuel flow, in an apparatus of the above character, in a manner to secure highly desirable automatic adjustments of fuel delivery to greatly increase the power plant performance when the aircraft is flying at various altitudes.

A further object includes the provision of an altitude correction or compensation in the fuel delivery to a jet propulsion apparatus, the arrangement being such that the compensating effect automatically adjusts the quantity of fuel delivered to the apparatus without the necessity of any attention on the part of the pilot.

A still further object resides in providing a novel apparatus for delivering fuel to the burner units of a gas turbine in a propulsion type power plant for aircraft, which will enable the aircraft to maneuver at various altitudes in a highly efficient manner, the arrangement functioning automatically to provide variations in the quantity of liquid fuel delivered, in order to secure the desired speed of operation of the turbine under varying flight conditions.

Still another object comprehends a novel fuel control, in apparatus of the foregoing character, which includes an automatic governing mechanism for securing substantially constant turbine speed at a power lever setting corresponding to maximum power output, regardless of variations in air density, and for varying fuel delivery at intermediate power control lever settings, as a function of air density, whereby the turbine operates in a highly efficient manner.

2

A still further object resides in interpolating an air density correcting factor in a fuel control mechanism for a gas turbine, the construction being such that the correcting factor varies with different throttle settings and different altitudes.

The above and other objects of the invention will appear more fully hereinafter from the following detailed description, when taken in connection with the accompanying drawings, which illustrate one form of the invention. It will be understood, however, that the drawings are utilized for purposes of illustration only and are not intended as a definition of the limits of the invention, reference being had for this purpose to the appended claims.

Referring to the drawings, wherein similar reference characters refer to similar parts throughout the several views:

Figure 1 is a longitudinal sectional view of a gas turbine or power plant installation embodying the novel fuel feeding mechanism of the present invention;

Figure 2 is a diagrammatic view partly in section showing the various parts constituting the novel fuel controlling apparatus, and Figures 3 and 4 are sectional views of one of the control members taken substantially along lines 3—3 and 4—4 of Figure 2.

Referring more particularly to Figure 1, the novel fuel controlling apparatus constructed in accordance with the present invention is illustrated therein as being associated with a jet propulsion apparatus 10 which may be conveniently mounted within an aircraft engine nacelle 12, as by means of any suitable type of support 14. In order to provide for the inlet and exhaust of air, the nacelle 12 is formed with an inwardly directed air inlet 16, and a gas outlet 18, the latter being shaped in such a manner as to constitute a reaction or exhaust passage for conducting the expanding gases to the atmosphere at the rear of the nacelle.

More particularly, the jet propulsion unit 10 is of the gaseous turbine type and includes a manifold 20 for conducting compressed air from a compressor 22 to a plurality of substantially cylindrical generators 24, disposed about the longitudinal axis of the nacelle 12, each of the generators including a burner unit 26, and the entire set of generators directing the gaseous products of combustion issuing therefrom into a collector ring 27 from which the gaseous products are directed against the blades 28 of a turbine 30. If desired, a set of stationary blades 32, mounted upon a support 34, may be provided for directing the gases against the blades 28 for securing the desired directive flow of such gases for maximum efficiency of operation. As illustrated, the turbine 30 is arranged to synchronously drive the compressor 22 through a shaft 36, rotatably mounted in the support 34.

For the purpose of controlling the flow of liquid fuel to the burner units 26, a novel control assembly is provided, and includes a fuel pump 52 which may be suitably mounted in a chamber 40 of the nacelle 12, and which is adapted to supply fuel under pressure to a header 42 as by means of a conduit 44. Fuel from the header 42 is distributed to the individual burner units 26 through a series of conduits 46, it being pointed out that each of the burner units is provided with a suitable fuel nozzle 48 to which the fuel is conducted, and from which the fuel issues in the form of a fine, swirling mist or spray which is mixed with the compressed air from the compressor 22, the resultant mixture being burned within each of the generators. A control lever 60 determines the rate or volume of delivery of the pump 52 and is adapted to be suitably connected, through mechanism hereinafter described, with the usual power control lever which is located conveniently to the pilot, for varying the speed of the turbine, and hence the aircraft.

The novel control mechanism for controlling the fuel flow under various conditions of operation is more particularly illustrated in Figure 2. The fuel pump 52 is of the variable stroke displacement type, drivably connected with the shaft 36, by means of a shaft 54 and gearing 56, and adapted to deliver varying amounts of liquid fuel from a source 58 to conduit 44, depending upon the position of the pump control element or lever 60. The pump 52 may be generally similar to that illustrated in my prior Patent No. 2,160,978, granted June 6, 1939, or may be of any suitable type wherein the stroke thereof may be varied by the lever 60, for the purpose of controlling the pump displacement and hence the quantity of liquid fuel pumped from the source 58 to the header 42. Such pumps are usually provided with a swash plate or its equivalent and a cylinder block containing a plurality of pistons arranged therein in a manner such that the stroke or effective displacement may be readily varied by changing the angle of the swash plate through the lever 60. Other types of pumps having the aforementioned characteristics of variable displacement may also be used for the fuel delivery and since devices of this character are well known, a detailed description thereof is not believed necessary.

In order that the pilot of the aircraft may readily control the position of the control lever 60 from a remote point, the latter may be interconnected with a pilot's power control lever 62 as by means of a pair of links 64 and 66, the latter being respectively, pivotally connected at one end thereof with the levers 60 and 62. The other ends of the levers are associated with each other through a novel control device 63 which comprises an important feature of the present invention, and which will be described in detail hereinafter.

As heretofore pointed out in the objects of the present invention, the same includes a novel arrangement for automatically varying the fuel flow to the generators under certain conditions of operation of the power plant, which may be encountered in flight. One of these important aspects resides in the incorporation of a correction or compensation of the fuel flow in accordance with variations in air density. Thus, during certain conditions of operation of the aircraft, the quantity of fuel delivered to the burner units is varied in accordance with changes in altitude and air temperature so that optimum efficiency of operation may be secured.

The foregoing advantageous results are secured by the employment of the device 63 which constitutes a novel arrangement for varying the quantity of fuel delivered to the burner units, under certain operating conditions, the variations in fuel flow being automatically achieved without any attention on the part of the pilot. More particularly, the device 63 comprises a lever 68, pivoted at 70 to one end of the link 64, and pivotally connected at its opposite end at 72, to the free end of a rod 74, guided for rectilinear movement within a stationary guide 76. A link 78 serves to pivotally connect the rod 74 and end 72 of lever 68 with link 66 so that movement of the latter in response to actuation of the pilot power control lever 62, may move the lever 68 about a pivot or fulcrum pin 80 in order to effect movement of link 64 and regulation of the pump control lever or element 60. As shown, pin 80 is secured to a block 82, slidably mounted within a casing 84, the pin projecting outwardly from the casing, see Figure 3, and being received within a slot 85 formed on the lever 68 intermediate the ends thereof, the slot being normally vertically arranged, as shown in Figure 2 when the controls 62 and 60 occupy the normal idling position A, shown in full lines. It will be readily understood from the construction just described, that all movements of the pilot power control 62, from the normal idling position to the full or maximum power position, shown at B, will cause corresponding movements of the lever 68 in order to secure adjustment of the stroke of pump 52 and consequent control of the quantity of liquid fuel conducted to the burner units 26. Thus, the speed of operation of the turbine 30 and the resulting speed of the aircraft may be readily controlled by the operator.

In order to secure a variation in the quantity of fuel delivered by the pump 52, in accordance with a variation in air density, during certain conditions of operation, a novel arrangement is employed for varying the ratio of movement between links 66 and 64 in such a manner that under such conditions, the link 64 and control element 60 may be automatically moved in response to variations in air density without causing any movement of the power control lever 62. Preferably the arrangement is such that the altitude or density compensation is incorporated in the linkage only when the pilot's power control 62 occupies a position other than the position A corresponding to idle or minimum power. It is also contemplated by the present invention that at full or maximum power position B of the power control 62, full air density compensation will be secured, while at all intermediate power positions between A and B, the air density compensation will diminish from the full compensation at full power setting B, to some incomplete or zero compensation at idling position A.

More particularly, the above altitude and air density compensation is secured by the cooperation between a cam member 86, slidably mounted to move within the casing 84 in response to variations in movement of an air density responsive device or aneroid 88, the member 86 being provided with a cam slot 90 receiving the pin 80 and the member 84 being also slotted as at 90' to permit vertical movement of the pin 80 in response to horizontal movement of said cam member 86. From this construction, it will be readily perceived that as the member 86 moves to the left, as viewed in Figure 2, the slot will cause the pin 80 and block 82 to be moved upwardly. Such upward movement of the pin 80 will carry the latter toward the upper end of the slot 85 in the lever 68, and since this pin constitutes the fulcrum for the said lever, the ratio of movement between the upper and lower ends of the lever will be varied. It will also be observed that in the event the parts occupy the full power position B, under conditions of sea level density, as shown, increase of altitude will, as above described, move the fulcrum pin 80 upwardly. Such movement will cause the upper end of lever 68 to move from position B toward position $B^1$ and to move the control lever 60 toward a similar position $B^1$, this movement having the effect of reducing the quantity of fuel delivered by the pump 52 to the burner units in proportion to the decrease in air density, and without affecting the position of the power control lever 62. For purposes of illustration, dotted lines, $B^1$, may indicate the position of the parts 60 and 68 at maximum altitude, with the power control 62 at the maximum power position B. Under conditions of maximum power position B of the control 62, the quantity of fuel delivered by pump 52 and varied as above set forth in accordance with changes in air density, will serve to maintain the speed of the turbine substantially constant irrespective of altitude changes.

The device 88 may be mounted at any convenient location so as to be responsive to the density of the air conducted to the generators 24 by the compressor 22. For example, it may be mounted within the chamber 40, Figure 1, and the latter provided with suitable openings 92 and 94, so that the atmosphere within the chamber will reflect variations in the density of the air flowing to the compressor.

In order to transmit movements of the air density responsive device 88 to the member 86, these two parts are preferably interconnected by a suitable type of torque amplifying or servo mechanism 96. As shown, such mechanism comprises a hydraulic servo piston 98 having a piston rod 100 pivotally connected with member 86, opposite sides of the piston being adapted to be alternately supplied with fluid under pressure by way of conduit 102, valve assembly 104 and conduits 106 and 108. Valve assembly 104 includes a spool valve 110 having a pair of chambers 112 and 114 separated by a land 116, movement of the valve being controlled by the expansion and contraction of the device 88, through a lever 118, pivotally connected at 120 to the device 88. Opposite ends of the lever 118 are respectively, pivotally connected at 122 and 124 with the valve 110 and the piston rod 100 in order to obtain the necessary valve operation for admitting and interrupting fluid pressure to the servo mechanism to secure power and follow up operations.

From the above, it will be readily perceived that the relatively small movements of the movable wall 126 of device 88, in response to variations in air density, will be amplified by the servo mechanism 96 in order to secure proportionate, power operation of the member 86. For example, with increase in altitude and consequent expansion of device 88, lever 118 will be moved counterclockwise about the connection 124 to open valve 110 and conduct fluid under pressure to the right of piston 98, as viewed in Figure 2, by way of conduit 102, chamber 114 and conduit 108. At the same time, the space to the left of the piston will be connected with an exhaust conduit 128 by way of conduit 106 and chamber 112. Upon movement of piston 98 to the left, member 86 will be correspondingly moved, and the parts will come to rest as soon as the valve 110 is returned to the lapped position illustrated. This occurs during movement of piston rod 100, which causes clockwise movement of lever 118 about connection 120 as a fulcrum. Any decrease in altitude will be accompanied by power operation of the member 86 in the opposite direction, the parts moving to rest when the valve laps in accordance with an opposite movement of the piston rod 100.

In operation, the turbine 30 is started in the usual manner as by rotating the shaft 36 through a suitable starter drive and supplying ignition to the various generators in order to ignite and burn the fuel and air mixture therein. As soon as the turbine becomes self-operative, it will be understood that the expanding gases from the generators rotate the turbine 30 and may thereafter be conducted through the exhaust passage 18 to the atmosphere to provide a jet propulsive effect.

Under conditions of starting and self-operation, it will be understood that the fuel pump 52 is rotated through the gearing 56 and shaft 36, in order to supply liquid fuel through the nozzles 48 by way of conduit 44, header 42 and conduits 46 associated with the respective burners 26, the fuel spray from the nozzles being mixed with the air from the compressor 22 which flows to the interior of the burners through suitable openings 130, and being burned in the said burners. Under conditions of sea level density, the parts occupy the positions shown in Figure 2, and in the event the pilot's power control 62 is set at the normal idling position A, the pump control element 60 will likewise take the position A which adjusts the stroke of the variable displacement pump 52 to a position such that the required quantity of fuel is delivered to the burners to secure proper minimum power or idling operation of the turbine. Under such conditions, the lever 68 occupies the substantially vertical position illustrated, and the pin 80 is at the lower end of the slot 85. With the parts in such idling position, variation in air density will have no effect upon the position of the element 60. This will be readily understood when it is considered that the slot 85 is vertically arranged, and movement of the member 86 to the left, as viewed in Figure 2, with increase in altitude, will merely move pin 80 upwardly in the slot 85 without effecting any movement of the lever 68. Hence, no altitude compensation is introduced under idling conditions of operation. Due, however, to the characteristics of a gas turbine, the speed of the latter will gradually increase with increase in altitude of the aircraft.

Assuming, however, that the pilot's power control 62 is moved to position B, corresponding to maximum power, and the aircraft is operating at sea level density, the pump control element or lever 60 will be moved to position B to cause the pump to deliver the maximum amount of fuel to drive the turbine at the maximum permissible operating speed. Such movement of the element 60 is effected by operation of links 66 and 78, the counter-clockwise movement of lever 68 about the fulcrum pin 80 causing the required operation of the link 64 and adjustment of throttle 60. If at this time, the altitude should be increased, the member 86 will be caused to be moved to the left, through expansion of the aneroid 88, and accompanying operation of servo mechanism 96, and the slot 90 will move the fulcrum pin 80 upwardly in the slot 85. During such movement of the pin, it will be understood that the block 82 moves upwardly in a vertical plane. Such movement of the pin, cooperates with the sides of the slot 85 to rotate the lever 68 in a clockwise direction about its lower end, indicated at position B, whereupon the upper end of the lever and the control element 60 move toward position $B^1$. Thus, under maximum power conditions, the quantity of fuel delivered is reduced in proportion to an increase in altitude, and is likewise increased in proportion to a decrease in altitude, it being pointed out that the slot 90 is so shaped as to secure this highly desirable result. With such a variation of the fuel delivered to the turbine, a substantially constant turbine speed will be secured, regardless of any change in altitude.

In the event that the control lever 62 is moved to an intermediate position, and with the aircraft at sea level density, it will be understood that the lever 68 will be moved in the previously described manner to adjust the pump control element 60 to provide the proper fuel delivery for such condition of operation. It will likewise be observed that due to the angular relation between the pin 80 and the slot 85, changes in the position of member 86, due to an increase in altitude will effect a movement of the link 64 to the right, which will be accompanied by a corresponding adjustment of the element or lever 60. Thus, the amount of fuel delivered by the pump will be decreased, upon increase in altitude, but the decrease will not be sufficient to maintain the speed of the turbine substantially constant as in the case of full power operation. Therefore, as in the case of minimum power operation, the turbine speed will increase, with increase in altitude, but the percentage of increase will diminish as the pump control element is opened an increasing amount until the constant speed condition, present at full power position of lever 62 is attained.

From the foregoing, it will be readily understood that by the present invention, a novel fuel feeding and controlling mechanism and method are provided for a gas turbine of the type which may utilize the expanding gases to secure a propulsive effect, and wherein an altitude compensation is incorporated in such a manner that the same varies from full compensation, under maximum power conditions, to zero compensation under minimum power or idling conditions. In effecting such compensation, a novel arrangement is employed for varying the quantity of fuel delivered to the turbine, to maintain substantially constant turbine speed, at a full power setting, regardless of variations in air density. At power lever settings intermediate idling and full power, the construction is such that the percentage of increase of turbine speed diminishes as the power lever approaches the maximum power setting. Thus, a highly efficient control of the fuel delivery for a gas turbine is achieved in order to secure optimum efficiency under all conditions of operation encountered in practice.

Although with the device herein particularly illustrated and described zero altitude compensation is obtained with the power lever 62 in idling position, due to the then existing parallel arrangement of the slot in lever 68 and the direction of movement of block 82, it will be readily apparent that partial altitude compensation may be obtained at idling merely by providing angularity between the slot and the block when the power control lever 62 is in its idling position.

While one embodiment of the invention has been shown and described herein, with considerable particularity, it will be understood by those skilled in the art, that the invention is not limited thereto, but is capable of a variety of expressions without departing from the spirit thereof. Reference will therefore be had to the appended claims for a definition of the limits of the invention.

What is claimed is:

1. In a system for controlling the supply of liquid fuel to the combustion chamber or chambers of a gas turbine engine, a device adapted to deliver fuel under pressure to said chamber or chambers and having a control element movable to different positions to vary the rate of delivery, a power control member movable to selected power positions between an idle setting and a maximum power setting, means operatively connecting said member to said element, and means responsive to changes in the pressure and/or temperature of the air flowing to the engine operatively associated with said connecting means including means adapted to automatically modify the position of said element at a given power setting of said member and to also modify the effective action of said member on said element when said member is moved to different power settings, said pressure and/or temperature responsive means being operative to effect a reduction in the rate of fuel delivery with a decrease in pressure and/or an increase in temperature, the percentage of such reduction progressively increasing with each increment of movement of said power control member in a power increasing direction.

2. In a system for controlling the supply of liquid fuel to the combustion chamber or chambers of a gas turbine engine, a device adapted to deliver fuel under pressure to said chamber or chambers and having a control element movable to different positions to vary the rate of delivery, a power control member movable to selected power positions between an idle setting and a maximum power setting, means operatively connecting said member to said element, means responsive to changes in the pressure and/or temperature of the air flowing to the engine operatively associated with said connecting means including means adapted to automatically modify the position of said element at a given power setting of said member and to also modify the effective action of said member on said element when said member is moved to different power settings, said last-named means also functioning to automatically render changes in pressure and/or temperature ineffective to modify the position of said element when said member is at an idle setting.

3. In a system for controlling the supply of liquid fuel to the combustion chamber or chambers of a gas turbine engine, a device adapted to deliver fuel under pressure to said chamber or chambers and having a control element movable to different positions to vary the rate of delivery, a power control member movable to selected power positions between an idle setting and a maximum power setting, linkage mechanism operatively connecting said member to said element, means responsive to changes in the pressure and/or temperature of the air flowing to the engine including motion-compensating means interposed in said linkage mechanism and adapted to automatically modify the position of said element at a given setting of said member and to also modify the effective action of said member on said element when said member is moved to different power settings; said pressure and/or temperature responsive means and said motion-compensating means including a movable cam and a follower therefor and an aneroid for positioning said cam, and said linkage mechanism including a motion compensating element having its effective action varied by said follower, the cam, follower and said compensating element being arranged to effect a compensating action such that the percentage of reduction in the rate of fuel delivery for a given decrease in pressure and/or a given increase in temperature progressively increases for each increment of movement of said power control member in a power increasing direction.

4. A system as claimed in claim 3 wherein when said power control member is set at idle or minimum power position, movement of said cam follower has no effect on the motion compensating element.

5. In a system for supplying liquid fuel to the combustion chamber or chambers of a gas turbine engine for aircraft, a variable stroke positive displacement pump adapted to be driven in relation to engine speed for delivering fuel under pressure to said chamber or chambers and having adjustable means for varying the rate of pump delivery, a power control member, means operatively connecting said member to said rate varying means, means responsive to changes in pressure and/or temperature of the air flowing to the engine also operatively connected to said rate varying means, means interconnecting said rate varying connecting means and said pressure and/or temperature responsive means arranged to permit variation of the rate of delivery of said pump by said pressure and/or temperature responsive means at a given setting of said power control member, said pressure and/or temperature responsive means being operative to effect a reduction in the rate of fuel delivery upon a decrease in pressure and/or an increase in temperature and said interconnecting means providing for the percentage of such reduction to progressively increase with each increment of movement of said power control member in a direction to increase the rate of fuel delivery.

FRANK C. MOCK.

REFERENCES CITED

The following references are of record in the file of this patent:

UNITED STATES PATENTS

| Number | Name | Date |
|---|---|---|
| 1,582,239 | Barbarou | Apr. 27, 1926 |
| 1,627,951 | Barbarou | May 10, 1927 |
| 2,280,835 | Lysholm | Apr. 28, 1942 |
| 2,330,558 | Curtis | Sept. 28, 1943 |
| 2,353,269 | Roth et al. | July 11, 1944 |
| 2,376,143 | Edwards et al. | May 15, 1945 |
| 2,407,115 | Udale | Sept. 3, 1946 |
| 2,412,289 | Push et al. | Dec. 10, 1946 |
| 2,414,617 | Summers | Jan. 21, 1947 |
| 2,422,808 | Stokes | June 24, 1947 |

FOREIGN PATENTS

| Number | Country | Date |
|---|---|---|
| 209,515 | Great Britain | Jan. 17, 1924 |
| 453,766 | Great Britain | Sept. 14, 1936 |